United States Patent [19]

Ogata et al.

[11] Patent Number: 5,538,657

[45] Date of Patent: Jul. 23, 1996

[54] METHOD OF PRODUCING FERRITE MAGNET

[75] Inventors: Yasunobu Ogata; Mikio Yamamoto, both of Fukaya, Japan

[73] Assignee: Hitachi Metals, Ltd., Tokyo, Japan

[21] Appl. No.: 288,903

[22] Filed: Aug. 11, 1994

[30] Foreign Application Priority Data

Aug. 12, 1993 [JP] Japan .................................. 5-200539
Jul. 7, 1994 [JP] Japan .................................. 6-156287

[51] Int. Cl.$^6$ .................................................. C04B 35/26
[52] U.S. Cl. .................................. 252/62.63; 252/62.62; 252/62.51 R; 501/1; 501/123
[58] Field of Search ............................ 252/62.63, 62.62, 252/62.51; 501/1, 123

[56] References Cited

U.S. PATENT DOCUMENTS

| | | | |
|---|---|---|---|
| 3,110,675 | 11/1963 | Brailowsky | 252/62.56 |
| 4,457,851 | 7/1984 | Tabaru et al. | 252/62.63 |
| 4,677,082 | 6/1987 | Alford et al. | 501/1 |
| 4,904,411 | 2/1990 | Novich et al. | 501/1 |

FOREIGN PATENT DOCUMENTS 55-6041 2/1980 Japan .
59-8047 2/1984 Japan .
2-98106 4/1990 Japan .

OTHER PUBLICATIONS

*Modern Ceramic Egineering*; Richerson, p. 180, Aug. 1984.

*Primary Examiner*—Melissa Bonner
*Attorney, Agent, or Firm*—Antonelli, Terry, Stout & Kraus

[57] ABSTRACT

A method of producing a ferrite magnet which comprises the steps of wet-grinding ferrite powder contained in a slurry to prepare a slurry of fine ferrite particles; concentrating the slurry of fine ferrite particles to have a predetermined solid content; kneading the concentrated slurry to disperse the fine ferrite particles; wet-compacting the kneaded slurry to form a green body; and sintering the green body to obtain the ferrite magnet. The ferrite powder having the following composition:

$$MO \cdot nFe_2O_3$$

wherein M is at least one element selected from the group consisting of Ba, Sr and Pb, and n is the number from 5 to 6. By employing the kneading process prior to the wet-compacting process, a high degree of particle orientation is achieved during the wet compacting in a magnetic field, enabling to produce a ferrite magnet having high magnetic properties.

10 Claims, 3 Drawing Sheets

SOLID CONTENT OF SLURRY TO BE KNEADED (Weight %)

METHOD OF PRODUCING FERRITE MAGNET

BACKGROUND OF THE INVENTION

The present invention relates to a method of producing a ferrite magnet having high magnetic properties.

A ferrite magnet has been used in various applications including an apparatus having a rotor such as motors, electric generators, etc.

As a method of producing a ferrite magnet, JP-B-55-6041 and JP-A-59-8047 disclose a so-called wet process in which a slurry of ferrite powders having a grain size of about 1 μm is wet-compacted in a magnetic field and the resulting compacted body is sintered to produce a ferrite magnet.

Recently, there has been an increasing demand for a ferrite magnet having higher magnetic properties, for example, a ferrite magnet having a residual magnetic flux density (Br) of 4000 G or more and a coercive force (iHc) of 4000 Oe or more. For meeting this demand, JP-A-2-98106 discloses addition of CaO, $SiO_2$, $B_2O_3$, $Al_2O_3$, $Cr_2O_3$, etc. to a ferrite component.

In addition to the above proposals, various studies have been made on material properties such as particle size, molar ratio of the constituents, etc. and on production conditions such as slurry temperature, sintering temperature, etc.

However, it has been difficult for a ferrite magnet to improve residual magnetic flux density and coercive force at a time. To improve the magnetic flux density, it is desired to achieve a high degree of crystal grain orientation and a high sintered density. For this purpose, it is desired to employ a higher sintering temperature to permit crystalline structure develop larger to some degree. On the other hand, a smaller grain size is desired in view of improving the coercive force. In summary, for obtaining a ferrite magnet having high magnetic properties, a sintered body should satisfy the following requirements:

(1) The average grain size of the sintered body is reduced to such a level as that of a single magnetic domain or less;

(2) The sintered body has a high degree of crystal grain orientation. In other words, the easy magnetization axes (C-axes) are orientated in one direction of anisotropy.; and (3) The sintered body has a high density.

In order to satisfy the requirements (1)–(3), it is necessary to achieve a high degree of particle orientation during compacting process in a magnetic field and to sinter the compacted body at an appropriate temperature. However, since the particles in a slurry are usually agglomerated physically and/or magnetically to form coarse particles, a sufficient degree of particle orientation cannot be attained.

In FIG. 2, a conventional method of producing a ferrite magnet is shown. In the conventional method, ferrite powders in a slurry are finely ground (step 1) by a mill such as an attritor, a pearl mill, etc. to form fine powders having a grain size of about 1 μm. The slurry containing the fine powders is then concentrated (step 2) to such a level that a concentrated slurry can be efficiently compacted. The concentration of a slurry is carried out by a spontaneous sedimentation, a centrifugal separation, etc. The concentrated slurry is then introduced into a molding apparatus and compacted (step 5) therein with the application of a magnetic field to obtain a green body. The green body is then sintered (step 6) to produce a ferrite magnet. In the conventional method, however, since the particles of fine powders are magnetically and/or physically agglomerated each other to form coarse particles, a sufficient degree of particle orientation cannot be achieved during the compacting process in a magnetic field, making it difficult to improve magnetic properties of a resulting ferrite magnet.

Under these circumstances, study has been made on the amounts of various additives, the addition timing thereof, sintering temperature, etc. in order to improve both the residual magnetic flux density and coercive force. However, there has been proposed no method which satisfies the above requirements.

OBJECT AND SUMMARY OF THE INVENTION

Accordingly, an object of the present invention is to provide a method of producing a ferrite magnet having both a high residual magnetic flux density and a high coercive force.

As a result of intense research in view of the above object, the inventors have found that the orientation of ferrite particles is remarkably improved by kneading a concentrated slurry of ferrite particles prior to a compacting process of a slurry because coarse particles of ferrite particles are disintegrated into individual fine particles by the action of shearing force, thereby enabling to producing a ferrite magnet having both a high residual magnetic flux density and a high coercive force. The inventors have further found that the addition of a dispersing agent into a slurry prior to kneading is effective to achieve a high degree of particle orientation in wet-compacting process. The present invention has been accomplished based on these findings.

In an aspect of the present invention, there is provided a method of producing a ferrite magnet which comprises the steps of wet-grinding ferrite powder contained in a slurry to prepare a slurry of fine ferrite particles, the ferrite powder having the following composition:

wherein M is at least one element selected from the group consisting of Ba, Sr and Pb, and n is the number from 5 to 6; concentrating the slurry of fine ferrite particles to have a predetermined solid content; kneading the concentrated slurry to disperse the fine ferrite particles; wet-compacting the kneaded slurry to form a green body; and sintering the green body to obtain said ferrite magnet.

In another aspect of the present invention, there is provided a method of producing a ferrite magnet which comprises the steps of wet-grinding ferrite powders in a slurry to prepare a slurry of fine ferrite particles, the ferrite powders having the following composition:

wherein M is at least one element selected from the group consisting of Ba, Sr and Pb, and n is the number from 5 to 6; concentrating the slurry of fine ferrite particles to have a predetermined solid content; kneading the concentrated slurry to disperse the fine ferrite particles; diluting the kneaded slurry with a suitable liquid to have a predetermined the content; wet-compacting the diluted slurry to form a green body; and sintering the green body to obtain said ferrite magnet.

DETAILED DESCRIPTION OF THE PREFERRED EMBODIMENTS

The ferrite powder used in the present invention has a composition represented by the following formula:

$$MO \cdot nFe_2O_3$$

wherein M is at least one element selected from the group consisting of Ba, Sr and Pb, and n is the number from 5 to 6. The preferred composition is $SrO \cdot nFe_2O_3$, wherein n is 5.5–6.0.

Figure 1:
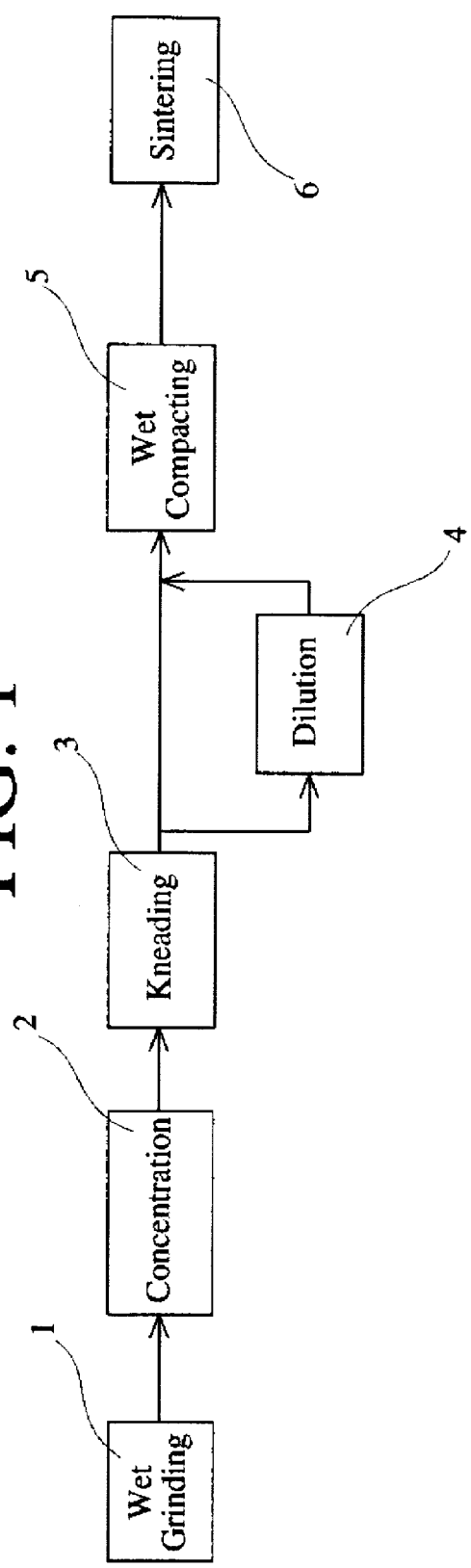
FIG. 1 is a flow chart showing a method of the present invention.
Figure 2:
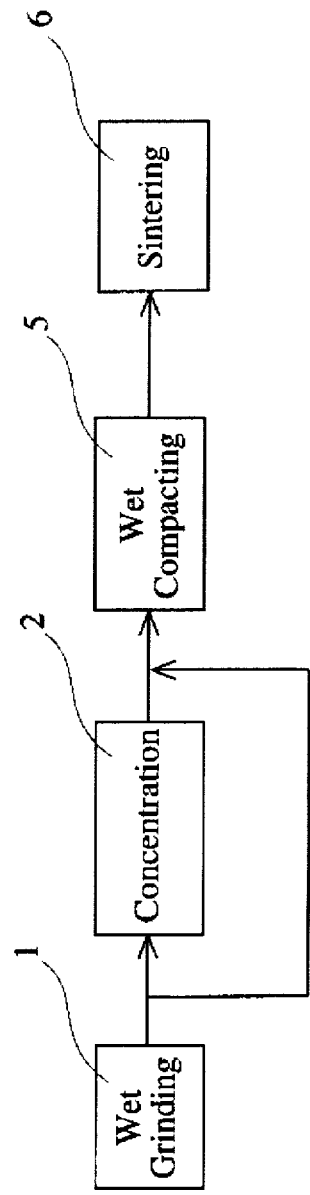
FIG. 2 is a flow chart showing a conventional method of producing a ferrite magnet.

FIG. 1 is a flow chart illustrative of the method of the present invention.

In the method of the present invention, coarse ferrite powders having the above composition are dispersed in a liquid such as water, a mineral oil, a synthetic oil, an organic solvent, etc., preferably after adding thereinto an additive such as $SrCO_3$, $SiO_2$, $CaCO_3$, $Cr_2O_3$, $Al_2O_3$, etc. to prepare a slurry preferably having a solid content of 35–55%.

The slurry thus prepared is then subjected to wet grinding (step 1) by a mill such as an attritor, a sand mill, etc. to form fine ferrite particles having an average particle size, measured by Fischer Subsieve Sizer, of 0.8 μm or less, preferably 0.6 μm or less. In view of magnetic properties, the average particle size is preferred to be as smaller as possible. Generally, the agglomeration tendency of fine particles becomes larger as the average particle size thereof becomes smaller. In the method of the present invention, however, the coarse ferrite powder is finely ground to have an average particle size of 0.8 μm or less because, as will be described in detail below, the agglomerated particles can be effectively disintegrated into individual fine particles by employing the kneading process.

The slurry containing fine ferrite particles is then concentrated (step 2) to have a solid content suitable for the subsequent kneading process. The concentration may be carried out by the following various methods.

(1) The slurry of fine ferrite particles is dried by heating at a temperature of 100°–200° C. for 1–24 hours under atmospheric pressure or reduced pressure to provide a dry mass of fine ferrite particles. The dry mass is then disintegrated to particles by a Henschel mixer, etc. The particles thus obtained are added with water, mineral oil, synthetic oil, organic solvent, etc. to adjust the solid content of the resulting slurry to a desired level;

(2) The slurry of fine ferrite particles is dried by heating at a temperature of 100°–200° C. for 1–24 hours under atmospheric pressure or reduced pressure to have a desired solid content;

(3) A part of the liquid in the slurry of fine ferrite particles is removed by a filter press method, a centrifugal dehydrator, etc. to achieve a desired solid content;

(4) A part of the liquid in the slurry of fine ferrite particles is removed by a filter press method, a centrifugal dehydrator, etc., and the pre-concentrated slurry is dried by heating at a temperature of 100°–200° C. for 1–24 hours to achieve a desired solid content;

(5) A part of the liquid in the slurry of fine ferrite particles is removed by a filter press method, a centrifugal dehydrator, etc., and the pre-concentrated slurry is mixed with dry ferrite powder in an amount sufficient to achieve a desired solid content. The dry ferrite powder is preferred to have the same composition as that of the starting ferrite powder. Further, the average particle size of the dry ferrite powder is preferred to be substantially the same as that of the fine ferrite particles already contained in the slurry; and (6) The dry ferrite powder, as described above, is added to the slurry of fine ferrite particles in an amount sufficient to achieve a desired solid content.

The solid content of the concentrated slurry obtained by the methods (1) to (6) is preferably 75–88 weight %, and more preferably 80–88 weight %.

The slurry thus concentrated is then kneaded (step 3) in a kneader. The kneading is preferably conducted at room temperature to 80° C. for 0.1–10 hours. During the kneading, the agglomerates formed magnetically and/or physically are disintegrated into fine particles by the action of shearing force.

The addition of a dispersing agent to the slurry prior to the kneading is preferred to highly disperse the fine ferrite particles because the dispersibility of the particles can be enhanced by the modification of the surface of the particles due to adsorption of the dispersing agent thereon. Since the slurry thus kneaded in the presence of a dispersing agent contains highly dispersed fine ferrite particles, a high orientation of the fine ferrite particles can be attained in the subsequent compacting process in a magnetic field, resulting in the improvement in magnetic properties of a resulting magnet.

As the dispersing agent for magnetic particles, surface-active agents, higher fatty acids, soaps of higher fatty acid, esters of higher fatty acid, etc. are known. Of these dispersing agents, it has been found by the inventors that an anionic surface-active agent such as polycarboxylic acid-type dispersing agent can remarkably enhance the dispersibility of the fine ferrite particles and effectively suppress the agglomeration thereof. Examples of the polycarboxylic acid-type dispersing agent may include an ammonium salt of polycarboxylic acid, a sodium salt of polycarboxylic acid, etc. Of these dispersing agents, an ammonium salt of polycarboxylic acid is preferred.

Since the coercive force (iHc) increases with the amount of the dispersing agent whereas the residual magnetic flux density (Br) decreases, the amount of the dispersing agent is preferably 0.1–5.0 weight %, and more preferably 0.5–3.5 weight %. When the amount exceeds 5.0 weight %, the sintered density is unfavorably reduced due to a gas generated by the decomposition of the dispersing agent, resulting in deterioration of magnetic properties of a ferrite magnet.

The slurry thus kneaded is then subjected to wet compacting (step 5) with or without dilution. In case of diluting the slurry (step 4), water, a mineral oil, a synthetic oil, an organic solvent, etc. may be used as a diluent. Although the solid content in the diluted slurry is not specifically restricted as long as a high degree of particle orientation is achieved in the next wet-compacting process in a magnetic field, a solid content of 60–80 weight % is preferred in view of the productivity. The wet-compacting process is conducted in a molding apparatus under a pressure of 200–1000 kg/cm² at room temperature to 80° C. while applying a magnetic field of 5–15 kOe to obtain a green body.

The sintering (step 6) of the green body may be conducted by a known method under a condition usually employed in the art. For example, the sintering may be conducted at 1150°–1250° C. for 0.5–10 hours in air.

The ferrite magnet produced by the method of the present invention preferably has a residual magnetic flux density of 4000–4700 G and a coercive force of 3500–5500 Oe.

The present invention will be illustrated in more detail by way of the following Examples without intention of restricting the scope of the claims attached hereto.

EXAMPLE 1

A powder mixture of $SrCO_3$ and $Fe_2O_3$ in such a proportion that the molar ratio of SrO and $Fe_2O_3$ was 1:5.9 was calcined at 1150° C. for 2 hours, and then dry-pulverized by a vibration mill to obtain a coarse powder. Added to the coarse powder were 0.3 weight % of $SiO_2$, 0.8 weight % of $CaCO_3$, and 0.8 weight % of $Cr_2O_3$, and then water was further added to obtain a slurry of a solid content of 40 weight %. The coarse powder in the slurry was subjected to wet grinding by an attritor to obtain a slurry containing fine ferrite particles having an average particle size, measured by Fischer Subsieve Sizer (hereinafter FSSS), of 0.53 μm. The slurry thus obtained was dried by heating at about 150° C. for 24 hours to obtain a dry mass of fine ferrite particles, which was disintegrated by Henschel mixer to obtain a powder. The powder thus obtained was added with water and 1.5 weight % of a 40-% aqueous solution of an ammonium salt of polycarboxylic acid to obtain a slurry having a solid content of 84 weight %. The slurry was then kneaded in a kneader at room temperature for 2 hours. After kneading, the slurry was diluted with water to have a solid content of 70 weight %, and then subjected to wet compacting by a molding apparatus under a pressure of 400 kg/cm² while applying a magnetic field of 8 kOe to form a green body. The sintering of the green body was conducted at 1180°–1220° C. for 2 hours to obtain an Sr-ferrite magnet.

Figure 3:
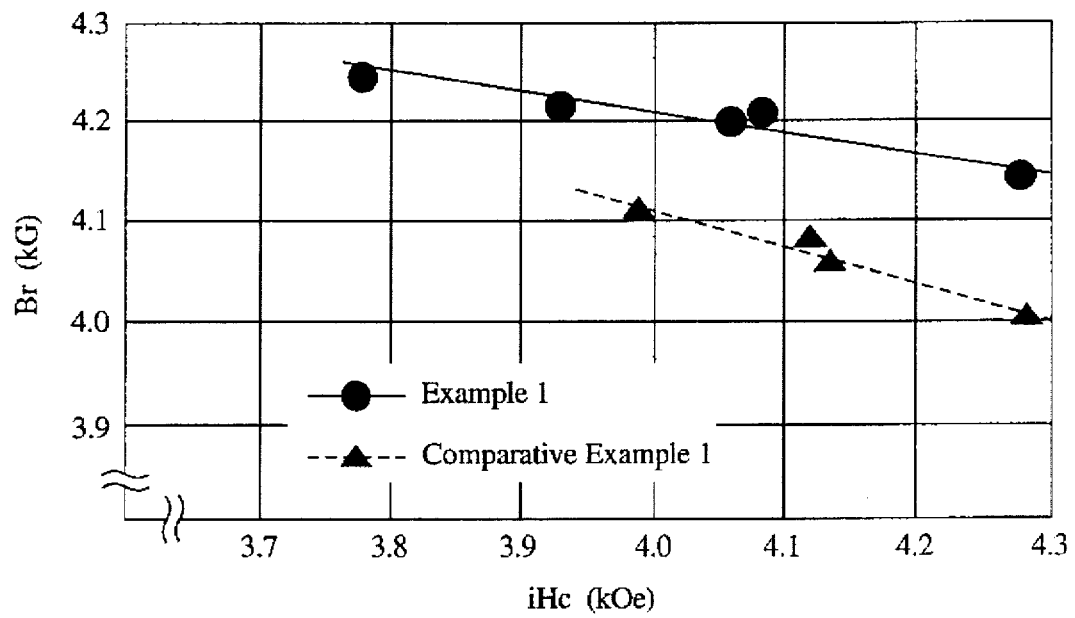
FIG. 3 is a graph showing relationships between the residual magnetic flux density (Br) and coercive force (iHc) of the ferrite magnets of Example 1 and Comparative Example 1.

The relationships between the residual magnetic flux density and coercive force of the ferrite magnet thus obtained are shown in FIG. 3.

Comparative Example 1

A ferrite magnet was produced according to a conventional method as shown below.

A powder mixture of $SrCO_3$ and $Fe_2O_3$ in such a proportion that the molar ratio of SrO and $Fe_2O_3$ was 1:5.9 was calcined at 1150° C. for 2 hours, and then dry-pulverized by a vibration mill to obtain a coarse powder. Added to the coarse powder were 0.3 weight % of $SiO_2$, 0.8 weight % of $CaCO_3$, and 0.8 weight % of $Cr_2O_3$, and then water was further added. The coarse powder in the slurry was subjected to wet grinding by an attritor to obtain a slurry containing fine ferrite particles having an average particle size, measured by Fischer Subsieve Sizer (hereinafter FSSS), of 0.53 μm. The slurry thus obtained was concentrated to a solid content of 40 weight % by centrifugal separation. The concentrated slurry was then subjected to wet compacting by a molding apparatus under a pressure of 400 kg/cm² while applying a magnetic field of 8 kOe to form a green body. The sintering of the green body was conducted at 1180°–1220° C. for 2 hours to obtain an Sr-ferrite magnet.

The relationships between the residual magnetic flux density and coercive force of the ferrite magnet thus obtained are shown in FIG. 3.

As seen from FIG. 3, the Sr-ferrite magnet produced by the method of the present invention shows more improved magnetic properties than that of the Sr-ferrite magnet produced by a conventional method.

EXAMPLE 2

A powder mixture of $SrCO_3$ and $Fe_2O_3$ in such a proportion that the molar ratio of SrO and $Fe_2O_3$ was 1:5.9 was calcined at 1150° C. for 2 hours, and then dry-pulverized by a vibration mill to obtain a coarse powder. Added to the coarse powder were 0.3 weight % of $SiO_2$, 0.8 weight % of $CaCO_3$, and 0.8 weight % of $Cr2O_3$, and then water was further added to obtain a slurry of a solid content of 40 weight %. The coarse powder in the slurry was subjected to wet grinding by an attritor to obtain a slurry containing fine ferrite particles having an average particle size of 0.8 μm measured by FSSS. After drying the slurry by heating at about 150° C. for 24 hours, the resulting dry mass of fine ferrite particles was disintegrated by Henschel mixer to obtain a powder. The powder thus obtained was added with water and 0.5 weight % of a 40-% aqueous solution of an ammonium salt of polycarboxylic acid to obtain a slurry having a solid content of 84 weight %. The slurry was then kneaded in a kneader at room temperature for 2 hours. After kneading, the slurry was diluted with water to have a solid content of 70 weight %, and then subjected to wet compacting by a molding apparatus under a pressure of 400 kg/cm² while applying a magnetic field of 8 kOe to form a green body. The sintering of the green body was conducted at 1180°–1220° C. for 2 hours to obtain an Sr-ferrite magnet.

The above procedures were repeated while changing the average particle size of the fine ferrite particles to 0.53 μm and 0.4 μm and the amount of the dispersing agent. Further, the procedures were repeated without adding the dispersing agent.

Figure 4:
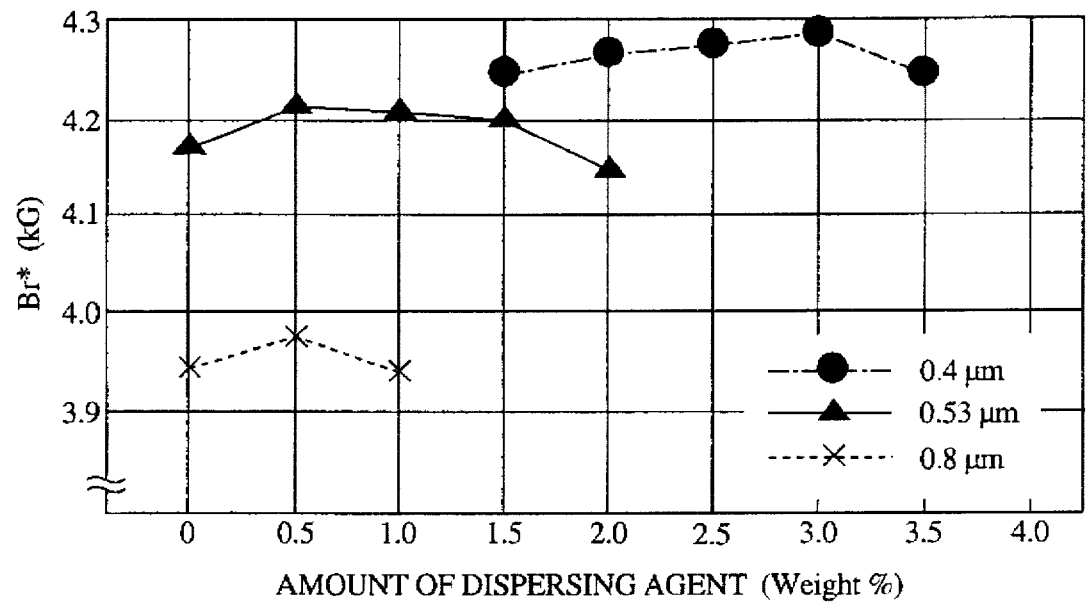
FIG. 4 is a graph showing relationships between the amount of dispersing agent and residual magnetic flux density (Br*) at iHc of 4000 Oe of the ferrite magnet of Example 2.

The relationships between the residual magnetic flux density (Br*) at the coercive force (iHc) of 4000 Oe and the amount of dispersing agent of the respective ferrite magnets are shown in FIG. 4. As seen from FIG. 4, the dispersing agent is preferred to be added in an amount of 0.5 weight % when the average particle size is 0.8 μm, 0.5–1.5 weight % in case of the average particle size of 0.53 μm and 3.0 weight % in case of the average particle size of 0.4 μm in view of magnetic properties. The optimum amount of the dispersing agent increases with decrease of the average particle size. This phenomenon is presumed due to increase in the specific surface area of the fine ferrite particles with decrease in the average particle size. Thus, the optimum amount of the dispersing agent depends on the average particle size and, as described above, 0.1–5.0 weight % is preferred in the present invention.

EXAMPLE 3

A powder mixture of $SrCO_3$ and $Fe_2O_3$ in such a proportion that the molar ratio of SrO and $Fe_2O_3$ was 1:5.9 was calcined at 1150° C. for 2 hours, and then dry-pulverized by a vibration mill to obtain a coarse powder. Added to the coarse powder were 0.3 weight % of $SiO_2$, 0.8 weight % of $CaCO_3$, and 0.8 weight % of $Cr_2O_3$, and then water was further added to obtain a slurry of a solid content of 40 weight %. The coarse powder in the slurry was subjected to wet grinding by an attritor to obtain a slurry containing fine ferrite particles having an average particle size of 0.53 μm measured by FSSS. After drying the slurry by heating at about 150° C. for 24 hours, the resulting dry mass of fine ferrite particles was disintegrated by Henschel mixer to obtain a powder. The powder thus obtained was added with water and 2.0 weight % of a 40-% aqueous solution of an ammonium salt of polycarboxylic acid to obtain a slurry having a solid content of 84 weight %. The slurry was then kneaded in a kneader at room temperature for 2 hours. The kneaded slurry was then diluted with water into various solid contents. Each of the diluted slurries was subjected to wet compacting by a molding apparatus under a pressure of 400 kg/cm$^2$ while applying a magnetic field of 8 kOe to form a green body. The sintering of the green body was conducted at 1180°–1220° C. for 2 hours to obtain each Sr-ferrite magnet.

The relationships between the magnetic properties and the solid content of the diluted slurry (the solid content of the slurry to be wet-compacted) are shown in Table 1 below.

TABLE 1

| Solid Content (weight %) | Br (G) | iHc (Oe) |
|---|---|---|
| 60 | 4120 | 4220 |
| 70 | 4150 | 4220 |
| 75 | 4180 | 4150 |
| 80 | 4090 | 4170 |
| 84 | 3320 | 4330 |

As seen from Table 1, a slight increase in the residual magnetic flux density appears when the solid content reaches 80 weight %. When the solid content reaches 84 weight %, the residual magnetic flux density is remarkably decreased. The upper limit of the solid content in this example is therefore about 75 weight % in order to produce a ferrite magnet having high magnetic properties. When the solid content of the slurry to be wet-compacted is too high, the viscosity of the slurry increases, meaning that the friction between individual particles also increases. Therefore, the orientation of the particles during the wet compacting is inhibited to cause a deterioration of the magnetic properties of a resulting magnet. In the method of the present invention, the agglomerates formed magnetically and/or physically are disintegrated into fine particles which are highly dispersed throughout the slurry by the action of shearing force generated by kneading a slurry having a solid content of 75–88 weight %. From Table 1, it can be seen that the solid content of the kneaded slurry is preferred to be reduced to a certain level by diluting with water, a mineral oil, an organic solvent, etc. before wet-compacting it. The dilution may be omitted when the kneaded slurry has a solid content suitable to be effectively wet-compacted. Since the viscosities of slurries having the same solid content are different from each other depending on the average particle sizes of fine ferrite particles contained therein, the optimum solid content is preferred to be selected depending on the average particle size.

EXAMPLE 4

A powder mixture of SrCO$_3$ and Fe$_2$O$_3$ in such a proportion that the molar ratio of SrO and Fe$_2$O$_3$ was 1:5.9 was calcined at 1150° C. for 2 hours, and then dry-pulverized by a vibration mill to obtain a coarse powder. Added to the coarse powder were 0.3 weight % of SiO$_2$, 0.8 weight % of CaCO$_3$, and 0.8 weight % of Cr$_2$O$_3$, and then water was further added to obtain a slurry of a solid content of 40 weight %. The coarse powder in the slurry was subjected to wet grinding by an attritor to obtain a slurry containing fine ferrite particles having an average particle size of 0.70 μm measured by FSSS. After drying the slurry by heating at about 150° C. for 24 hours, the resulting dry mass of fine ferrite particles was disintegrated by Henschel mixer to obtain a powder. The powder thus obtained was added with water and 1.0 weight % of a 40-% aqueous solution of an ammonium salt of polycarboxylic acid to obtain a slurry having a solid content of 75 weight %. The slurries was then kneaded in a kneader at room temperature for 2 hours. After kneading, the slurry was diluted with water to have a solid content of 75 weight %, and then subjected to wet compacting by a molding apparatus under a pressure of 400 kg/cm$^2$ while applying a magnetic field of 8 kOe to form a green body. The sintering of the green body was conducted at 1180°–1220° C. for 2 hours to obtain an Sr-ferrite magnet.

The above procedures were repeated while changing the average particle size of the fine ferrite particles to 0.63 μm and 0.46 μm and the solid content of the slurry to be kneaded.

Figure 5:
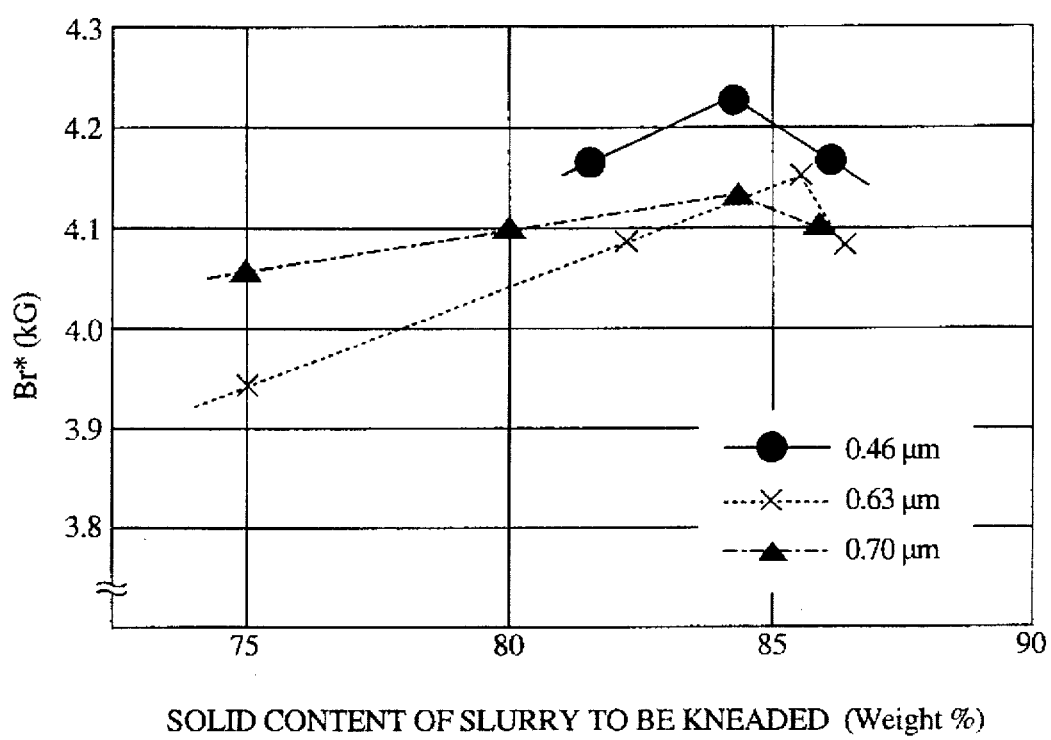
FIG. 5 is a graph showing relationships between the solid content of a slurry to be kneaded and residual magnetic flux density (Br*) of the ferrite magnet of Example 4.

The relationships between the residual magnetic flux density (Br*) at the coercive force (iHc) of 4000 Oe and the solid content of the slurry to be kneaded are shown in FIG. 5.

As seen from FIG. 5, the residual magnetic flux density (Br*) increases with decrease in the average particle size. Further, it is found that there is an optimum solid content for each average particle size. The reason for this is presumed as follows. When the solid content is too low, shearing force is not exerted sufficiently on the slurry. On the other hand, when the solid content is too high, shearing force is hardly generated due to a high viscosity of the slurry. Thus, when the solid content is too high or too low, the agglomerates cannot be effectively disintegrated. This causes deterioration in the orientation of the particles during wet compacting in a magnetic field, resulting in poor improvement in magnetic properties. The optimum solid content for achieving an effective disintegration of the agglomerates may be determined depending on the average particle size and the state of the slurry, and as described above, a solid content of 75–88 weight % is preferred.

What is claimed is:

1. A method of producing a ferrite magnet which comprises the steps of:

wet-grinding ferrite powder contained in a slurry to prepare a slurry of fine ferrite particles, said ferrite powder having the following composition:

wherein M is at least one element selected from the group consisting of Ba, Sr and Pb, and n is a number from 5 to 6;

concentrating said slurry of fine ferrite particles to have a solid content of 75–88 weight %;

kneading the concentrated slurry to disintegrate agglomerates formed magnetically and/or physically into individual fine ferrite particles by action of shearing force on the agglomerates;

diluting the kneaded slurry with a suitable liquid to have a solid content of 60–80 weight %;

wet-compacting the kneaded slurry while applying a magnetic field to form a green body; and sintering said green body to obtain said ferrite magnet.

2. The method of producing a ferrite magnet according to claim 1, wherein the concentrating step consists of drying said slurry of fine ferrite particles to provide a dry mass of fine ferrite particles; disintegrating said dry mass into fine ferrite particles; and adding a suitable liquid to said fine ferrite particles to have said solid content.

3. The method of producing a ferrite magnet according to claim 1, wherein the concentration is conducted by drying said slurry of fine ferrite to have a predetermined solid content.

4. The method of producing a ferrite magnet according to claim 1, wherein the concentration is conducted by removing a part of a liquid component in said slurry of fine ferrite particles to achieve said solid content.

5. The method of producing a ferrite magnet according to claim 1, wherein the concentrating step consists of removing a part of a liquid component in said slurry of fine ferrite particles to have said solid content.

6. The method of producing a ferrite magnet according to claim 1, wherein the concentrating step consists of removing a part of a liquid component in said slurry of fine ferrite particles; and mixing the resulting slurry with a dry ferrite powder in an amount sufficient to achieve said solid content, said dry ferrite powder having the same composition as that of said ferrite powder and substantially the same average particle size as that of said fine ferrite particles.

7. The method of producing a ferrite magnet according to claim 1, wherein the concentration is conducted by mixing said slurry of fine ferrite said with a dry ferrite powder in an amount sufficient to achieve said solid content, said dry ferrite powder having the same composition as that of said ferrite powder and substantially the same average particle size as that of said fine ferrite particles.

8. The method of producing a ferrite magnet according to claim 1, wherein a dispersing agent is added to said concentrated slurry prior to the kneading step in an amount of 0.1–5.0 weight %.

9. The method of producing a ferrite magnet according to claim 1, wherein said fine ferrite particles have an average particle size of 0.8 μm or less, said average particle size being measured by Fischer Subsieve Sizer.

10. The method of producing a ferrite magnet according to claim 1, wherein said fine ferrite particles have an average particle size of 0.6 μm or less, said average particle size being measured by Fischer Subsieve Sizer.

* * * * *